Nov. 2, 1971 W. B. MARTZ ET AL 3,616,478

APPARATUS FOR CLEANING MAGNETIC RECORDING TAPE

Filed July 17, 1970

INVENTORS
*William B. Martz and*
*Leonard L. Curado*
BY
*Kenway, Jenney & Hildreth*
ATTORNEYS United States Patent Office 3,616,478
Patented Nov. 2, 1971

3,616,478
APPARATUS FOR CLEANING MAGNETIC RECORDING TAPE

William B. Martz, Manchester, and Leonard L. Curado, Marshfield Hills, Mass., assignors to Computer-Link Corporation, Burlington, Mass.
Filed July 17, 1970, Ser. No. 55,841
Int. Cl. G11b *5/00*
U.S. Cl. 15—93 4 Claims

ABSTRACT OF THE DISCLOSURE

In the tape cleaning apparatus disclosed herein, magnetic tape is drawn across a cutting edge on a ceramic blade so as to slice any adhering foreign particles from the coated face of the tape. The blade is constructed in elongate form and has a generally hourglass-shaped cross-section providing four parallel cutting edges, each edge having an included angle of about sixty degrees. Further, the path of the tape is arranged so that it approaches the cutting edge at an angle which produced a cutting action rather than a scraping action.

BACKGROUND OF THE INVENTION

This invention relates to an apparatus for cleaning magnetic recording tape and more particularly to such apparatus which operates by cutting foreign particles from the face of the tape, rather than merely scraping them off.

In magnetic tape cleaning systems developed heretofore, it has been known to scrape the tape to remove large foreign particles, e.g., prior to a wiping operation. However, the nature of the scraping operation is such that some small particles may tend to be driven into the magnetic tape coating rather than being removed therefrom. Further, it is also possible to damage the magnetic coating by the scraping operation.

Among the several objects of the present invention may be noted the provision of tape cleaning apparatus in which foreign particles on the face of the tape are cut away rather than being scraped off; the provision of such apparatus which will clean tape quickly and efficiently; the provision of such apparatus which is relatively long-lived and reliable in operation; the provision of such apparatus which does not damage the tape being cleaned; the provision of such apparatus employing a blade having relatively long life; the provision of such apparatus which is relatively simple and inexpensive. Other objects and features will be in part apparent and in part pointed out hereinafter.

SUMMARY OF THE INVENTION

Briefly, the tape cleaning apparatus of the present invention employs an elongate tape cleaning blade constructed of a substantially crystalline ceramic material. The blade is of an approximately hourglass-shaped cross-section which provides a pair of substantially parallel faces linked by a pair of opposing concave faces. This shape provides four parallel cutting edges, each having an included angle of about sixty degrees. The blade is mounted on the tape transport system so that a selected one of the cutting edges is exposed. The tape is then drawn across this exposed edge with the path of travel of the tape being selected so that the tape approaches the exposed edge at an angle of slightly greater than 90 degrees to the portion of the concave face adjacent to the edge. The tape then leaves that edge at a shallow angle to the respective parallel face. Accordingly, particles adhering to the face of the tape bearing against the blade are cut away by the blade rather than being merely scraped off.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
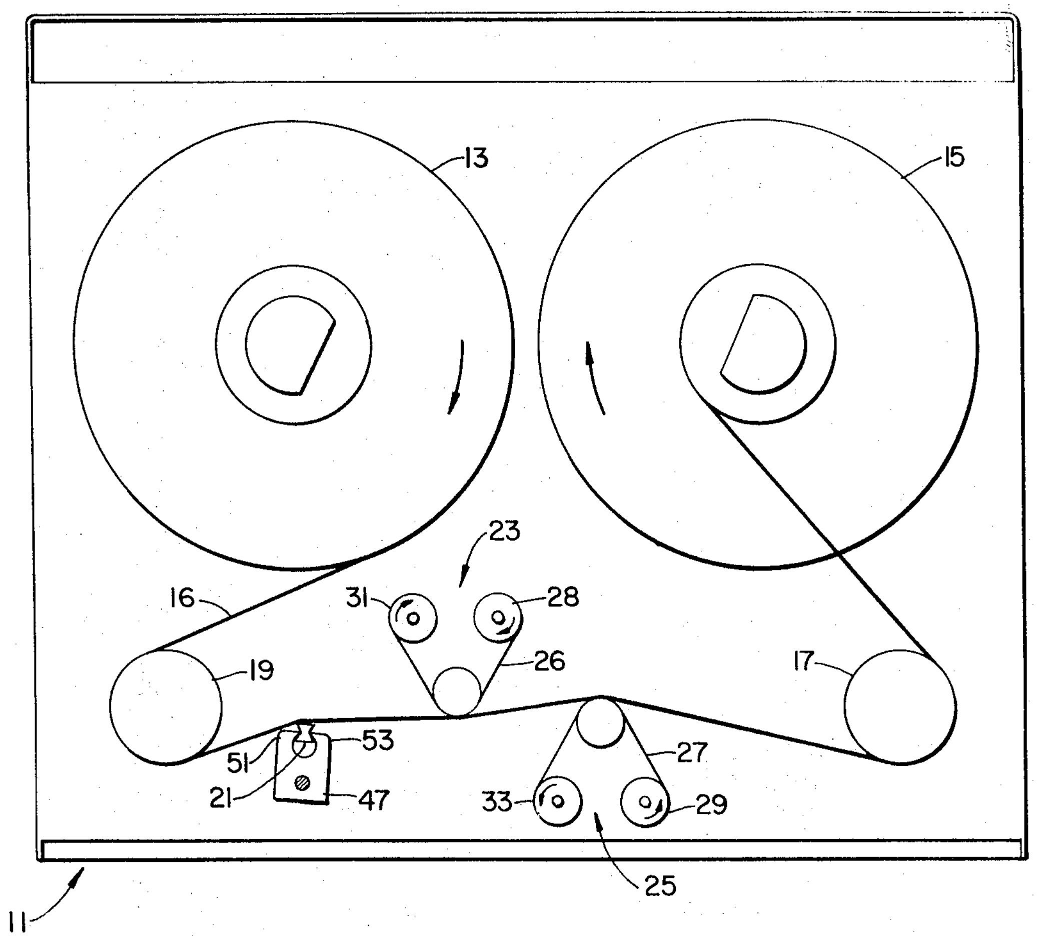
FIG. 1 is a plan view of magnetic tape cleaning apparatus employing a cleaning blade constructed in accordance with the present invention.

Referring now to FIG. 1, there is indicated at 11 generally a tape transport mechanism of substantially conventional construction and employing a pay-out reel 13 and a take-up reel 15 for the magnetic tape 16 which is to be cleaned. As is conventional, the speed of travel of the tape between the two reels is controlled by a capstan drive roller 17. The tape also passes over an idler roller 19.

In the cleaning operation itself, the magnetic tape is drawn past a cutting blade 21, described in greater detail hereinafter, and past a pair of wiping devices 23 and 25. In each of the wiping devices, a respective face of the magnetic tape is drawn across a porous cleaning tape, e.g. as indicated at 26 and 27. The cleaning tapes are gradually replenished from source spools 28 and 29 and are collected on take-up spools 31 and 33.

Figure 2:
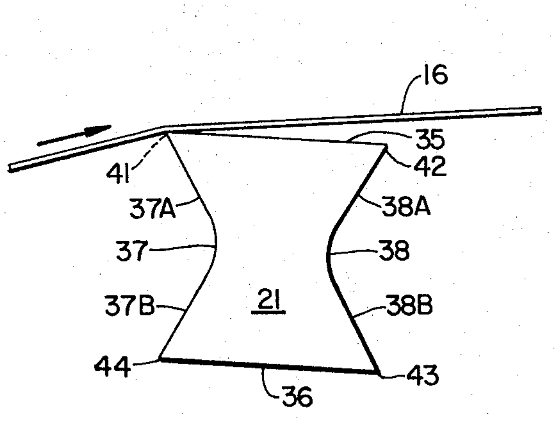
FIG. 2 is a plan view, to enlarged scale, of the tape cleaning blade employed in the apparatus of FIG. 1.
Figure 3:
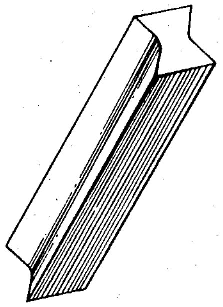
FIG. 3 is a perspective view of the blade.

Referring now more particularly to FIGS. 2 and 3, it may be seen that the blade 21 is elongate and generally of hourglass-shaped cross-section. Being of hourglass-shaped cross-section, the blade 21 comprises a pair of parallel faces 35 and 36 which are linked or connected by a pair of generally concave faces 37 and 38. These surfaces intersect to form four parallel cutting edges 41–44, as illustrated, each of which has an included angle of about 60 degrees. In the embodiment illustrated, each of the concave surfaces is illustrated as comprising two angled flat surfaces 37A and 37B and 38A and 38B respectively, but it should be understood that more or less curvature and/or sharpness of the concavity may be employed as desired.

In order to withstand the abrasion of the magnetic coating on the recording tape, the cutter blade 21 is constructed of a substantially crystalline ceramic material such as aluminum oxide or tungsten carbide.

As is illustrated in FIG. 1, the blade 21 is mounted in a holder 47, so that a selected one of the cutting edges, i.e., the cutting edge 41 as illustrated, is exposed to the coated side of the magnetic recording tape as it travels between the reels 13 and 15. The orientation of the cutter and the path of the tape are mutually arranged so that, in being drawn over the cutting edge 41, the tape 16 approaches the cutter at an angle of more than 90 degrees to the adjacent portion 37A of the respective concave surface 37 and leaves the cutting edge at a relatively small or shallow angle to the respective parallel face 35.

The significance of these angles is as follows. In order to provide a cutting action, as opposed to a scraping action, the angle between the approaching tape and the operative face of the cutter must be greater than 90 degrees. In order to maintain contact between the tape and the cutting edge, the path of the tape must be deflected by the cutting edge, i.e. there must be some degree of "wrap" of the tape around the cutter. It follows, therefore, that the included angle at the cutting edge must be significantly less than 90 degrees. However, since substantially crystalline ceramic materials are used in order to withstand the abrasion of the tape and give a reasonable cutter life, it is not feasible to provide extremely acute cutting edges, such ceramic materials being effectively limited to angles of greater than 45 degrees. Further, sharp cutting edges, e.g. those having an included angle of less than 45 degrees, would substantially increase the likelihood that a flaw could cause the cutting edge to dig into the tape and to cut it through. It has thus been found that, for the purposes of the present invention, the included angle of each of the cutting edges should be in the order of 60 degrees.

The hourglass-shaped cross-section of the present cutter serves to provide a blade having four cutting edges 14–44, each having the desired included angle. In this way, the usual lifetime of a cutter blade can be multiplied by merely turning and inverting the ceramic cutting element 21 within its holder 47.

A further advantage of the hourglass-shape is that the concave surfaces 37 and 38 provide a convenient means for holding and precisely positioning the blade 21 relative to the tape transport mechanism. In other words, these concave surfaces, by their inherent nature, provide highly suitable reference point for the mounting fixture. In the embodiment illustrated, the holder merely comprises a block of a somewhat resilient material, cut away as illustrated to provide a pair of jaws 51 and 53 which clamp the cutter blade in the proper position.

In view of the foregoing, it may be seen that several objects of the present invention are achieved and other advantageous results have been attained.

As various changes could be made in the above construction without departing from the scope of the invention, it should be understood that all matter contained in the above description or shown in the accompanying drawings shall be interpreted as illustrative and not in a limiting sense.

What is claimed is:

1. In a tape transport system for magnetic recording tape, apparatus for removing foreign particles from the face of said tape, said apparatus comprising:

an elongate blade constructed of a substantially crystalline ceramic material, the cross-section of said blade being of approximately hour-glass shape thereby providing a pair of substantially parallel faces with a pair of opposite concave faces linking the parallel faces and forming therewith four parallel cutting edges, each edge having an included angle of about sixty degrees;

means for holding said blade with a selected one of said cutting edges being substatnially exposed;

means for guiding a magnetic tape carried by said transport in a path which changes direction at said selected edge, the path of travel of the tape being such that the tape approaches said blade at an angle of greater than ninety degrees to the portion of the concave face adjacent said selected edge and leaves said selected edge at a shallow angle to the respective one of said parallel faces, whereby particles adhering to the face of said tape which bears against the blade are cut away by the blade.

2. Apparatus as set forth in claim 1 wherein said material is aluminum oxide.

3. Apparatus as set forth in claim 1 wherein said material is tungsten carbide.

4. In a system for transporting magnetic recording tape, apparatus for removing foreign particles from the face of said tape, said apparatus comprising:

an elongate blade constructed of a substantially crystalline ceramic material, the cross-section of said blade being of approximately hour-glass shape thereby providing a pair of substantially parallel faces with a pair of opposite concave faces linking the parallel faces and forming therewith four parallel cutting edges, each edge having an included angle substantially less than ninety degrees and substantially greater than forty-five degrees;

means for holding said blade with a selected one of said cutting edges bearing against a face of said tape so that the path of travel of the tape changes direction at said selected edge, the path of travel of the tape being such that the tape approaches said blade at an angle of slightly greater than ninety degrees to the portion of the concave face adjacent said selected edge and leaves said selected edge at a shallow angle to the respective one of said parallel faces, whereby particles adhering to the face of said tape which bears against the blade are cut away by the blade.

References Cited

UNITED STATES PATENTS

| | | | |
|---|---|---|---|
| 3,370,314 | 2/1968 | Morello | 15—308 |
| 3,370,982 | 2/1968 | Hayunga | 134—9 |
| 2,586,472 | 2/1952 | McKown | 15—236 R |

LEON G. MACHLIN, Primary Examiner

U.S. Cl. X.R.

274—47